United States Patent [19]

Guilhem

[11] Patent Number: 4,657,798
[45] Date of Patent: Apr. 14, 1987

[54] FLAT COMPOSITE BOARD

[76] Inventor: Jacques M. Guilhem, Domaine du Val Martin, 06560 Valbonne, France

[21] Appl. No.: 780,558

[22] Filed: Sep. 26, 1985

[30] Foreign Application Priority Data

Sep. 28, 1984 [FR] France ................................ 84 14963

[51] Int. Cl.$^4$ ............................................. B32B 3/00
[52] U.S. Cl. .................................... 428/71; 52/309.9;
52/406; 52/588; 156/79; 264/45.3; 264/46.5;
264/46.6; 428/157; 428/317.5; 428/318.4;
428/319.7
[58] Field of Search ................... 52/309.8, 309.9, 406,
52/407, 583, 587; 428/71, 76, 157, 317.5, 318.4,
319.7; 156/79; 264/45.3, 46.5, 46.6

[56] References Cited

U.S. PATENT DOCUMENTS

| | | | |
|---|---|---|---|
| 3,298,150 | 1/1967 | Ahlquist | 428/76 |
| 3,493,449 | 2/1970 | Krug | 156/79 |
| 4,284,673 | 8/1981 | Ockels | 428/54 |
| 4,377,609 | 3/1983 | Bartoli et al. | 428/71 |

FOREIGN PATENT DOCUMENTS

| | | | |
|---|---|---|---|
| 1452441 | 8/1966 | France | 428/71 |
| 1305808 | 2/1973 | United Kingdom | 428/319.9 |

Primary Examiner—William J. Van Balen
Attorney, Agent, or Firm—Wolf, Greenfield & Sacks

[57] ABSTRACT

A flat composite board or panel for covering the vertical walls of rooms, which consists of a core (3) of synthetic foam produced in situ, an outer layer (2) having a decorative front surface (20) and a rear surface (21) to which the foam adheres, a synthetic layer (4) which adheres to the foam (3) by its front surface (41) and the rear surface (42) of which is covered with a web of fibres, the decorative front surface (20) of the board and its edges (12, 12') being covered with a sealed protective thermoplastic film (1) cooperating with the front surface (41) of the inner layer (4) to which it is secured at its ends (10) so as to form a sheath which limits the expansion of the foam and designed to be removed after the board has been fitted in position.

11 Claims, 3 Drawing Figures

FLAT COMPOSITE BOARD

BACKGROUND OF THE INVENTION

The present invention relates to a flat composite board or panel intended, in particular, for covering the vertical walls of rooms in dwelling-places, such as kitchens or bathrooms, or in commercial or industrial premises or even in swimming pools.

PRIOR ART

The use of composite boards with a robust and washable surface has already been proposed for covering the walls of rooms which frequently become dirty, such as kitchens and bathrooms. Coverings of this type have to be able to withstand substantial variations in temperature, of the order of from −10° to +70° C., and above all a high degree of humidity.

For this reason, the only acceptable solutions lie in employing heavy support materials and a fitting procedure which requires more than one highly skilled craftsman. This necessity raises the cost price of the coverings to levels which are frequently unacceptable.

At the same time, it has already been proposed, for insulation purposes, to cover the walls of rooms in dwelling-places with composite boards of the type known as "PLACOPLATRE" or "PREGYPAN" (registered trade marks), which have an inner surface, in particular foam-based, able to be fixed directly to vertical walls of means by plaster plugs and an outer facing of plaster. Boards of this type are particularly advantageous with regard to the cost price of fitting them, since the latter does not incur costly labour charges, only needing a plasterer to mix the plaster but not to smooth it, no other trade materials being involved whatever the state of the wall surface.

However, boards of this type, after being fitted in position, have to be joined by means of a coating and then covered with a decorative finishing element which is expensive both in respect of material and labour.

Moreover, coatings of this type are liable to be affected by humidity; therefore, they cannot be used in bathrooms where the plaster would eventually run the risk of becoming detached.

Another disadvantage of boards of this type concerns their thickness which results in a not negligible reduction in the habitable area.

The present invention proposes to obviate these drawbacks by developing a composite board or panel which is inexpensive with regard to manufacture and fitting, which is able to withstand substantial variations in temperature and is resistant to very moist atmospheres, thereby enabling it to be used in bathrooms, and which can be used as it is, namely without final preparation.

SUMMARY OF THE INVENTION

For this purpose, the invention relates to a composite board of the above-mentioned type, characterized in that it comprises a core of synthetic foam produced in situ by expansion starting from a liquid resin to which conventional additives have been added, an outer layer having a decorative front surface and a rear surface to which the foam adheres, together with a synthetic inner layer which adheres to the foam by its front surface and of which the rear surface is covered with a web of fibres intended to enable the board to be secured in a mechanically reliable and physically strong manner to the walls to be covered, in particular by means of plugs of plaster, the front decorative surface of the board and also its edges being covered with a sealed protective thermoplastic film, preferably of polyethylene, cooperating with the front surface of the inner layer, to which it is secured at its ends so as to form a sheath limiting the expansion of the foam and intended to be removed by tearing, after the board has been fitted in position.

DETAILED DESCRIPTION OF THE INVENTION

Therefore, the panel according to the invention is ready to be used directly. It can be fitted very simply by the user himself at a moderate cost price.

Of course, the length and width of the boards according to the invention may be of any size desired and they depend, on the one hand, on the material used and, on the other hand, on requirements; nevertheless, a width of less than 1 m is considered to be desirable.

In accordance with the invention, the foam is thus formed "in situ" inside the sheath defined by the inner layer and the protective thermoplastic film which, by necessity, has to be non-shrinking and may, if necessary, be porous to air but not to liquids so as to allow any air or gases liable be formed during the expansion reaction to escape to the outside.

In fact, it is a matter here of a conventional expansion operation, whereby the initially liquid product passes successively into a "creamy" state, then into soft foam and, finally, into a hard foam.

The foam used in accordance with the invention has to be such that the composite board may be classified M1 in accordance with the C.S.T.B. standard. Accordingly, as starting product there may be chosen polyisocyanurates and/or phenolic or furanic resins, if necessary reinforced by the incorporation, prior to polymerization, of a web of glass fibres. The polyurethanes cannot be used as they are but they necessarily have to be reinforced, in particular by incorporating glass fibres.

Of course, the invention is not limited to the above-mentioned examples of foamed products and the use of any expanded product may be considered, including cellular concrete, without thereby departing from the scope of the invention.

In accordance with the invention, the web of fibres used most generally is a web of glass fibres.

According to another feature of the invention, the inner layer comprises a plastics film, in particular of polyethylene, the web of fibres being fixed to this latter, particularly by thermal welding.

It is essential for the web of glass fibres to be perfectly welded by one of its faces to the polyethylene film but sufficiently detached therefrom at its other face to enable the fibres to be attached to the plugs of plaster provided on the surface of the wall to be covered, thus improving not only the rigidity of the panel fastening but also its resistance to humidity and to variations in temperature.

According to the invention, it is possible to use as the inner layer a commercial fibre web/polyethylene composite product, wherein one end of some fibres is attached to the polyethylene whereas their other end is free and may assist in fastening the board to the plaster.

According to another feature of the invention, the outer layer consists of a compression-moulded laminated plastics material with a basis of filler sheets impregnated with phenolic resin, forming its rear surface, and of melamine-based covering sheets, forming its decorative front surface, and rear surface of this layer having been previously polished.

A product of this type, corresponding to the above definition, is available commercially under the name FORMICA (registered trade mark).

The expansion of the foam contiguous with the polished surface of this product automatically ensures that it is bonded to the foam.

A continuous process enabling FORMICA to be produced in rolls has already been proposed. However, it was observed that the properties of the product thus obtained were inferior to those of the product obtained using the conventional process and did not allow it to be utilized, for example, for horizontal coverings, such as tables or desks, particularly because it lacked resistance to abrasion.

Nevertheless, it has been shown that continuously produced FORMICA in roll form can be used satisfactorily within the scope of the invention, taking into account the fact requirements of a vertical covering are different to those associated with horizontal coverings. In accordance with the invention, it is possible to select a product with a thickness of from 6 to 15 mm, depending on the density of the foam, so as to comply with the conditions imposed by the C.S.T.B. with respect to impact strength (balls, sand bags) and a modulus of elasticity of the complex which is compatible with the fitting method. It would even be possible to use a product of substantially lower thickness and thus more economical, by combining it with a non-homogeneous foam, produced in two stages and consisting of a thin (about 5 mm) very dense first layer adhering to the outer layer and of a second very voluminous layer with a thickness of the order of 3 cm, of low density and adhering to the inner layer; in this case, the hard first layer enhances the impact strength and thus enables a thinner product to be used for the outer layer.

In a particularly advantageous manner and, according to another feature of the invention, it has been observed that it was possible use as the outer layer a composite material consisting of FORMICA (registered mark), of which only the front decorative layer has been retained, its rear surface having almost entirely polished away, glued on to sheets of plaster sandwiched between two layers of cardboard and available commercially (for example, the product sold under the trade marks "PLACOPLATRE" or "PREGYPAN"). This composite material, which can be produced using a continuous process starting from polished FORMICA (registered trade mark) wound into rolls, offers the advantage of having excellent impact strength because of the PLACOPLATRE (registered mark), combined with excellent abrasion resistance because of the use of a FORMICA (registered mark) with a highly plasticized surface.

Of course, despite these advantages, the invention is not restricted to using, for the outer layer, the material defined above or even a laminated material; in fact, it is also possible to use a mineral or metallic plastic material, provided that it is continuous.

According to another feature of the invention, the edges of the board are covered with a layer of non-stick material, in particular silicon, disposed below the protective film so as to make it easier for it to be torn away after the board has been fixed to the wall. Therefore, after the expansion process, the edges of the board are covered with a smooth "skin" of foam.

According to another feature of the invention, the ends of the front decorative surface of the outer layer are covered, at least over a small part of the width, with a self-adhesive material enabling it to be fastened to the protective film so as to prevent any overflow of resin towards the front whilst it is being expanded.

The use of narrow strips of self-adhesive material at the ends of the front surface of the outer layer makes it possible to reduce as much as possible the amount of this material which has to be used and, therefore, to lower the cost price of the board as a whole; however, there are available commercially films whose entire surface is already covered with a self-adhesive material and their use may also be envisaged within the scope of the invention.

In any case, after the board has been fitted, to effect the "finishing" of the wall, it is only necessary to strip the protective film from the decorative surface by tearing away the self-adhesive portion and the silicon-treated portion protecting its edges.

A completely finished surface is thus provided, which may be left as it is, without it being necessary to apply any coating, protective layer or supplementary covering.

To improve further the fitting together of the boards, and according to another feature of the invention, the ends have, alternately, a male section and a female section.

Sections of this type can be produced directly by a continuous grinding operation of the edges.

A variant of this embodiment lies in providing only edges having a female section, connected to one another by means of a tongue.

According to the invention, it is also possible to use for the outer layer not a flat sheet but a sheet folded into a U-shape so as to form both the front surface and the edges of the board.

In fact, as indicated above, panels of "FORMICA" type (registered mark) are commercially available having a thickness substantially less than those considered previously (of the order of 0.6 mm). These products have the advantage of being able to be post-formed with a radius of curvature of the order of 5 to 6 mm, i.e. approximately at the right angle. The use of such outer layers of angular shape makes it possible to offer the advantage that this use is associated with the possibility, with equal strength, of considerably reducing the thickness of the board and, therefore, the bulkiness of the whole whilst assuring an aesthetically satisfactory appearance.

Of course, such a reduction in the thickness of the boards could not be proposed if it is also desired to utilize them for their thermal insulation and sound proofing properties.

One difficulty encountered during the post-forming of sheets of "FORMICA" (registered mark), with the aim of imparting a U-shape to their edges, is associated with the need to carry out local heating of the ends of these sheets, which, in view of the fact that they are not heat conducting, results in local expansion and the formation of "bulges" in the central portion of these sheets, whereby the final aesthetic appearance of the board is in danger of being spoilt.

In order to avoid these drawbacks, the invention proposes to use for the outer layer commercially available boards of "FORMICA" (registered mark) incorporating a metallic foil, in particular of aluminium.

According to another feature of this invention, the front decorative surface of the U-shaped outer layer is covered with a film of self-adhesive material which makes it possible to ensure the fastening of the outer layer to the protective film, the outwardly curved ends of which make it possible to ensure the fastening of the front surface of the inner layer to the ends of the protective film.

The provision of this self-adhesive film makes it possible to substantially simplify the manufacture of the board according to the invention and, therefore, to lower its cost price by eliminating the operation of welding the protective film to the inner layer.

Another advantage of such angular sections is that they are commercially available in already fully pre-glued form.

According to another feature of this invention, it is possible to propose the production of an outer layer having a U-shaped whose ends are folded inwards, namely bent four times a right angles; this arrangement would enable the inner layer to be glued directly to the turned-over ends of the U, previously covered, of course, with a film of self-adhesive material.

The invention is not restricted to the above-described examples of embodiment; for example, it would be possible to provide boards whose inner layer is formed by joining one or more boards of "FORMICA" (registered mark), the ends of which are bent into a "beak" shape, whereby the finished is provided with disengaged portions which, firstly, serve as reinforcements and, secondly, improve the overall aesthetic appearance.

The composite boards described above may be manufactured using any suitable process, in particular by a process originating from that disclosed in French Patent Application No. 84 06 847, or by a process such as that disclosed in French Pat. No. 1,525,046, by pouring an expandable liquid resin between continuously driven laminae, between which the sheet intended to form the outer layer has been previously inserted.

The features of the board forming the subject-matter of the invention will now be described in more detail with reference to the accompanying drawings, wherein.

Figure 1:
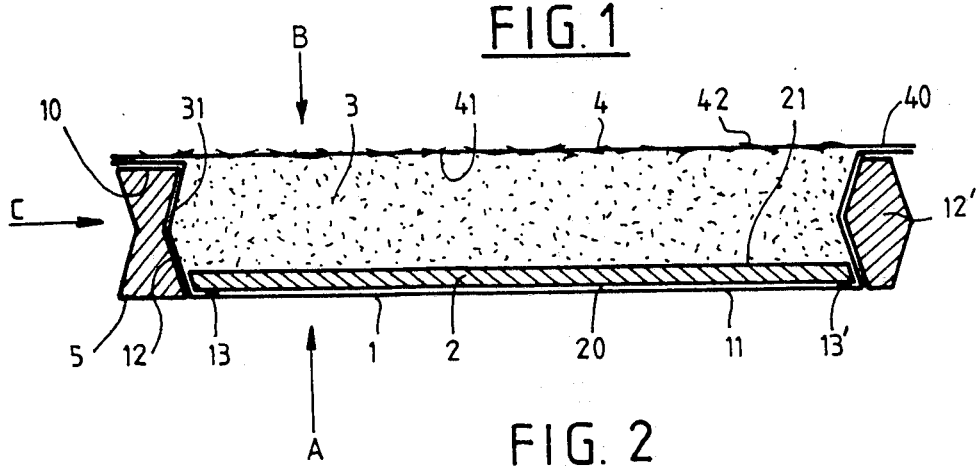
FIG. 1 is a sectional view of a board in accordance with a first embodiment of the invention, during manufacture.

According to FIG. 1, the board comprises, in conventional manner, a front surface A formed by an outer layer 2, a rear surface B formed by an inner layer 4 and edges C. The front face A and the edges C are covered by a sealed thermoplastic film 1 of polyethylene, having approximately U-shaped section and the inner ends 10 of which are turned over towards the outside of the board. The bottom and the lateral arms 12 and 12' of the U-shaped polyethylene film 1 define a trough-shaped protective sheath which is used during the manufacture of the board and intended to be removed by being torn away after the board has been fitted.

The side ends 13 and 13' of the bottom 11 of this trough are covered with a self-adhesive material, over a narrow width of the order of 1 cm, whereas its lateral arms 12, 12' are covered with a layer of non-stick material, in particular silicon.

As already mentioned, the entire surface of the film could also be covered with self-adhesive material.

The outer layer 2 of the board 1 is situated immediately adjacent, with its front decorative surface 20, to the inner surface of the protective film 11, to which it is attached by means of strips 13, 13' of self-adhesive material.

Preferably, this outer layer 2 consists of a compression-moulded laminated plastics material with a basis of filler sheets impregnated with phenolic resin, forming its rear surface 21 which has been previously polished, and of melamine-based covering sheets which form its decorative front surface 20.

The characteristic product of the type described above is that available commercially under the name "FORMICA" (registered mark). As already mentioned, it is possible to use as the outer layer a commercially available "FORMICA" (registered mark) incorporating within it a metallic foil, in particular of aluminium.

The polished rear surface 21 of the outer layer 3 ((sic)) is covered with a foam core 3 consisting in particular of an expanded poly-isocyanurate deposited originally in the form of a liquid resin and then converted "in situ" into a foam by the action of conventional additives. The resin thus deposited may comprise, for example, the following constituents a and b:

| | % by weight |
|---|---|
| Constituent a | |
| Polyisocyanate | 71.2 |
| Surface-active agent | 1.1 |
| Blowing agent | 15.0 |
| Constituent b | |
| Polyols | |
| anhydrous diethylene glycol | 5.4 |
| triol | 0.9 |
| diol | 5.3 |
| Catalysts | |
| amine salt | 0.5 |
| metallic carboxylate | 0.1 |
| dimethylaminomethyl phenol | 0.4 |

With a view to reinforcing the foam, the liquid resin may also contain a web of glass fibres which migrate to the interior of the foam during the expansion reaction.

The "in situ" expansion of the resin is limited by the sheath formed by the lateral arms 12, 12' of the protective film 1 and by the polished rear surface 21 of the outer layer 2.

In conventional manner, an expansion process is involved, during which the resin passes successively from a liquid state into a creamy state, then into a soft foam and, finally, into a hard foam.

Starting from the creamy state, the inner layer 4 is welded at its two ends 40 to the turned-over edges 10 of the polyethylene film 2 ((sic)) so as to form the above-mentioned sheath, inside which the polymerization operation is completed to provide the finished board. The foam 3 adheres to the polished rear surface 21 of the outer layer 2 and to the front surface 41 of the inner layer 4 which, in turn, consists of a synthetic thermoplastic material able to be attached to the film 2 ((sic)) by thermal welding.

As already mentioned above and in a manner not illustrated in the drawings, the foam core 3 may be the result of a double polymerization and may comprise a thin first layer of very dense foam adhering to the outer layer and a second layer of very low density but substantially greater thickness, adhering to the inner layer.

The presence at the lateral ends of the bottom 11 of the polyethylene film of the self-adhesive strips 13, 13' assists in the production of an entirely satisfactory board by preventing the penetration of resin under the outer layer 2.

Similarly, because of the presence on the lateral arms 12, 12' of a non-stick product, in particular a silicon-based product, a skin 31 of resin is formed opposite thereto which enables the protective film 2 ((sic)) to be removed very easily by tearing, after the board has been fitted, and here too ensures that a satisfactory board is obtained.

Moreover, the front surface 41 of the inner layer 4 formed by a plastics film, in particular of polyethylene, is covered with a web of glass fibres 42 secured by thermal welding.

The presence in this web of glass fibres having exposed ends thus tends to improve the fastening of the board to a vertical wall by means of slightly elastic plugs of plaster, not shown in the drawing, the thickness of which, of the order of between 2 and 4 cm, depends on the surface condition of the supporting element and has to be greater in the case of a brick or bondstone wall than in the case of surface formed by concrete slabs or smooth plaster.

To sum up, the board according to the invention is composed, viewed from the outside inwards, of the outer layer whose front surface 20 is decorative, of the foam core 3 and of the inner layer 4 whose rear surface 42 is provided with glass fibres facilitating its fastening to a vertical wall. The rear surface 21 of the outer layer 2 and the front surface 42 of the inner layer 4 are liable to adhere to the foam during its formation.

A protective film 2 ((sic)) covers the front surface 11 of the board and also its edges 12 and 12' and is is secured by its turned-over ends 10 to the ends 40 of the inner layer 4.

After the fitting, the protective film has to be torn away, which is any extremely simple operation, firstly, because of the formation of "skins" of resin 31 on the edges and, secondly, because of the addition of non-stick products and the presence of strips 13, 13' which preclude any penetration of resin beneath the outer layer 2.

The boards according to the invention can be fitted directly side-by-side on a vertical wall without the addition of any coating.

To enable different boards to be fitted together, the edges 12, 12' of a board are alternately of male section and female section, formed by the application of heating rollers 5, 6 of corresponding shape in the course of manufacture. Likewise, it would also be possible to provide only boards having a female section joined by means of a tongue.

Figure 2:
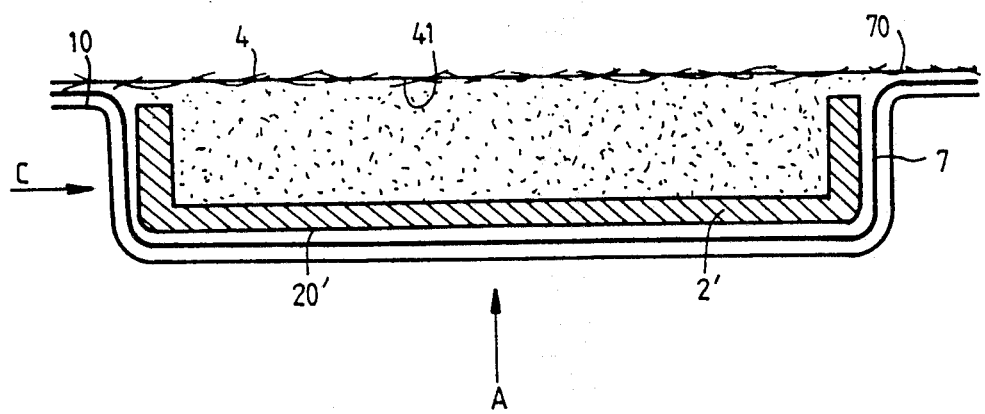
FIG. 2 is a sectional view corresponding to a board in accordance with a second embodiment of the invention.

According to FIG. 2, the outer layer is not flat but is formed by a sheet 2', in particular of "FORMICA" (registered mark) with a thickness in the order of 0.6 mm folded into a U-shape so as to define not only the front surface A of the board but also its edges C.

This angular shape, which has been obtained by prior post-forming of the sheet 2', is designed to impart maximum rigidity to the panel as a whole.

The front decorative surface 20' of the outer layer 2 is entirely covered with a film of self-adhesive material 7 which makes it possible to ensure that it is fixed to the protective film 1 intended to be torn away, after the board has been fitted.

The ends 70 of the self-adhesive film are curved outwards so that they can be used to ensure the fastening of the front surface 41 of the inner layer 4 and of the ends 10 of the protective film 1.

This arrangement makes it possible to avoid the addition of a non-stick layer in the vicinity of the edges.

As indicated above and in a manner not illustrated in the drawings, it would also be possible to use a U-shaped inner layer whose ends are curved inwards.

Figure 3:
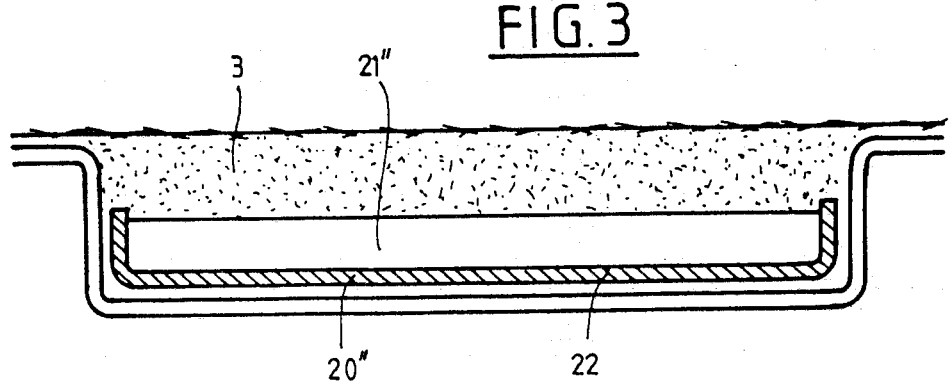
FIG. 3 is a sectional view of a board in accordance with another embodiment of the invention.

According to FIG. 3, the outer layer is a composite layer comprising a sheet of Formica 20", of which only the front decorative surface has been retained in practice (the laminated rear surface having been almost entirely polished away), joined by means of a layer of adhesive 22 to a sheet of plaster sandwiched between two layers of commercial cardboard 21", in particular a sheet of PLACOPLATRE OR PREGYPAN (registered marks). This arrangement is particularly advantages because it enables good abrasion resistance, provided by the FORMICA (registered mark), to be combined with excellent impact strength, provided by the PLACOPLATRE or PREGYPAN (registered marks).

Furthermore, the use of a FORMICA supplied in rolls and manufactured under a pressure of 20 kg (instead of the normal 140), namely a product with a highly plasticized surface, makes it possible to obtain, as a result of its radius of curvature of about 4 mm, as is the arrangement shown in FIG. 2, an element folded into a U-shaped also covering the edges of the plaster sheet 21.

By way of example, a product corresponding to the variant of embodiment illustrated in FIG. 3 may be produced by applying an entirely continuous process starting either from a film of FORMICA (registered mark), itself produced continuously (of HPLM type) with a thickness of between 0.4 and 0.6 mm, or from a film of FORMICA (registered mark) produced discontinuously and with a thickness of between 0.5 and 0.7 mm.

Upon putting this process into operation, the film of FORMICA (registered mark) is firstly unwound in a continuous process, then glued by being sprayed with a neoprene adhesive or of other known type, prior to receiving on its sides sheets of PLACOPLATRE or PREGYPAN (registered marks) appplied discontinuously.

The product used is preferably a PLACOPLATRE or PREGYPAN or HD grade consisting of plaster of "OURS BLANC" type sandwiched between sheets of cardboard weighing between 100 and 400 g per square meter; the sheets thus obtained have a thickness of between 8 and 12 mm. These sheets are produced by the manufacturer with one rounded edge having a radius of curvature of between 4 and 6 mm (disposed on the side of the FORMICA (registered mark) and one free edge; the round edge is formed by turning the cardboard during the manufacture of the PLACOPLATRE or PREGYPAN (registered marks).

The adhesion of the sheets of PLACOPLATRE (registered mark) to the FORMICA registered mark) is effected under pressure; the glued edges of the FORMICA (registered mark) are turned over the PLACOPLATRE or PREGYPAN (registered marks) to a height of between 1 and 4 cm; a satisfactory product is thus obtained as a result of the provision of the rounded edges of the sheets of PLACOPLATRE (registered mark).

To prevent any deformation of the flat part of the product this obtained or the formation of bulges along its edges, the operation of turning over the edges of the FORMICA has necessarily to following the gluing operation. The desired U-shaped section may be obtained by applying two different procedures, namely soft-forming and post-forming. Soft-forming is carried out at low temperature (80° to 100° C.) and does not alter the molecular structure of the material, whereas in post-forming, on the contrary, curing is effected at 160° C. to 180° C., which is liable to alter this structure; in these circumstances, soft-forming is employed in the case of a material which has already in its finally cured state, whereas post-forming is applied to a material which has not been entirely cross-linked (the temperature of 160° C.–180° C. being sufficient to effect this cross-linking).

When the composite sheets of FORMICA (registered mark)/PLACOPLATRE (registered mark) have been produced, the application of the process continues by interposing, beneath them, the thermoplastic film forming the protective sheath during the foam-forming operation.

The manufacture of the sheets is then continued in the manner described, for example, in French Patent No. 84 06 847, wherein to effect the pouring a movable head is displaced transversely (in zig-zag fashion) at a speed of the order of 1 m per second, thereby making it possible to deposit the stream of material practically edge to edge and to obtain the correct distribution of the liquid associated with satisfactory foaming performance.

The boards thus obtained are generally of a width of between 30 and 90 cm, preferably equal to 60 cm; their thickness is a function of the properties ultimately desired and will be thinner if a product of purely decorative type is required than if a product also having acoustic and thermal insulation properties is desired.

As indicated above, the boards according to the invention may include, along their edges, a series of corresponding ribs and grooves to facilitate their connection; they may also be provided only with grooves joined by means of tongues 3 ((sic)); when being joined together, the different boards may be disposed either edge to edge or, preferably, at a certain distance apart so as to compensate for possible dimensional variations in the fabric of a building. In fact, if the various boards are separated, they are independent of one another and are affected by possible structural movement only over their own surface, which is an important consideration in view of the fact that these boards, which are a finished product, are designed to be fitted to the fabric of a building.

I claim:

1. A flat composite board or panel intended, in particular, for covering the vertical walls of rooms in dwelling-places or in commercial or industrial premises, which consists of a core of synthetic foam produced in situ by expansion starting from a liquid resin to which conventional additives have been added, an outer layer having a decorative front surface and a rear surface to which the foam adheres, together with a synthetic inner layer which adheres to the foam by its front surface and the rear surface of which is covered with a web of fibres intended to enable the board to be secured in a mechanically reliable and physically strong manner to the vertical walls to be covered, the decorative front surface of the board and also its edges being covered with a sealed protective thermoplastic film, cooperating with the front surface of the inner layer, to which it is secured at its ends so as to form a sheath limiting the expansion of the foam and designed to be removed, after the board has been fitted in position.

2. A composite board according to claim 1 wherein the foam is selected from the group comprising the polyisocyanurates, phenolic or furanic resins and polyurethanes, if necessary reinforced by glass fibres.

3. A composite board according to claim 1 wherein the web of fibres is a web of glass fibres.

4. A composite board according to claim 1 wherein the inner layer comprises a plastics film, the web of glass fibres being fixed thereto.

5. A composite board according to claim 1 wherein the outer layer consists of a compression-moulded laminated plastics material with a basis of filler sheets impregnated with phenolic resin, forming its rear surface, and of melamine-based covering sheets, forming its decorative front surface, the rear surface of this layer having been previously polished.

6. A composite board according to claim 5 wherein the outer layer is a composite layer formed by melamine-based covering sheets, forming its decorative front surface, glued to a sheet of plaster sandwiched between two layers of cardboard forming its rear surface.

7. A composite board according to claim 1 wherein the edges thereof are covered with a layer of non-stick material, disposed below the protective film.

8. A composite board according claim 1 wherein the ends of the decorative front surface of the outer layer are covered, over a small part of the width, with a self-adhesive material enabling it to be fastened to the protective film so as to prevent any overflow of resin towards the front whilst it is being expanded.

9. A composite board according to claim 1 wherein its edges thereof have, alternately, a male section and a female section.

10. A composite board according to claim 1 wherein the outer layer is folded into a U-shape and forms both the front surface and the edges of the board.

11. A composite board according to claim 10 wherein the decorative front surface of the U-shaped outer layer is covered with a film of self-adhesive material which makes it possible to ensure the fastening of the outer layer to the protective film, the outwardly curved ends of which make it possible to ensure the fastening of the front surface of the inner layer to the ends of the protective film.

* * * * *